Figure 1:
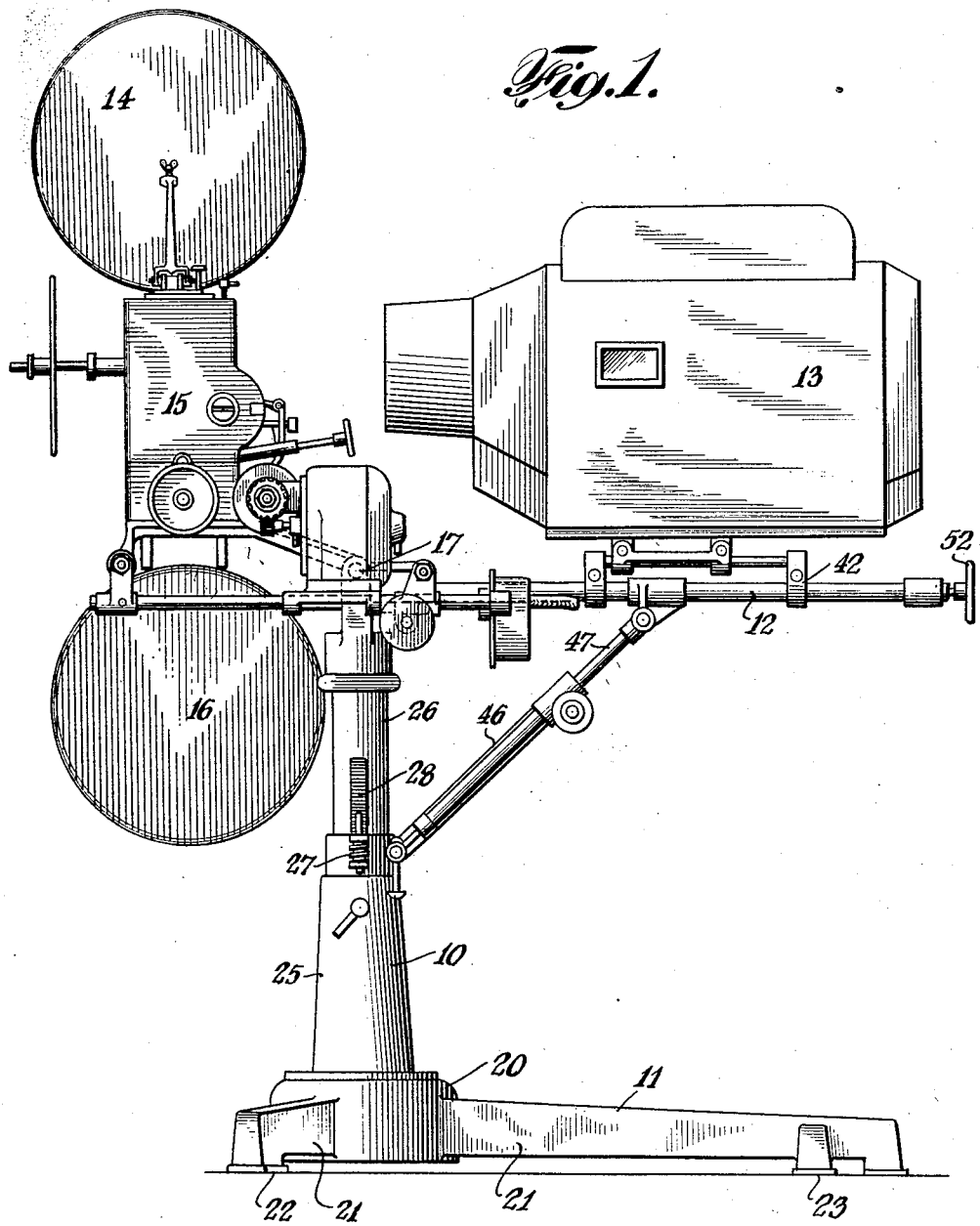

June 2, 1931. A. DINA 1,808,497
ADJUSTABLE SUPPORT FOR MOTION PICTURE PROJECTION MACHINES
Filed Aug. 18, 1927 4 Sheets-Sheet 1

Inventor
Augusto Dina
By his Attorney
Howard W. Dix

June 2, 1931. A. DINA 1,808,497
ADJUSTABLE SUPPORT FOR MOTION PICTURE PROJECTION MACHINES
Filed Aug. 18, 1927 4 Sheets-Sheet 2
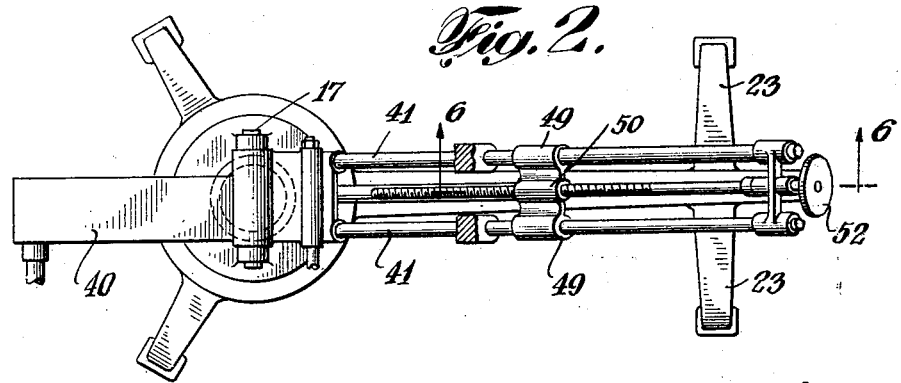
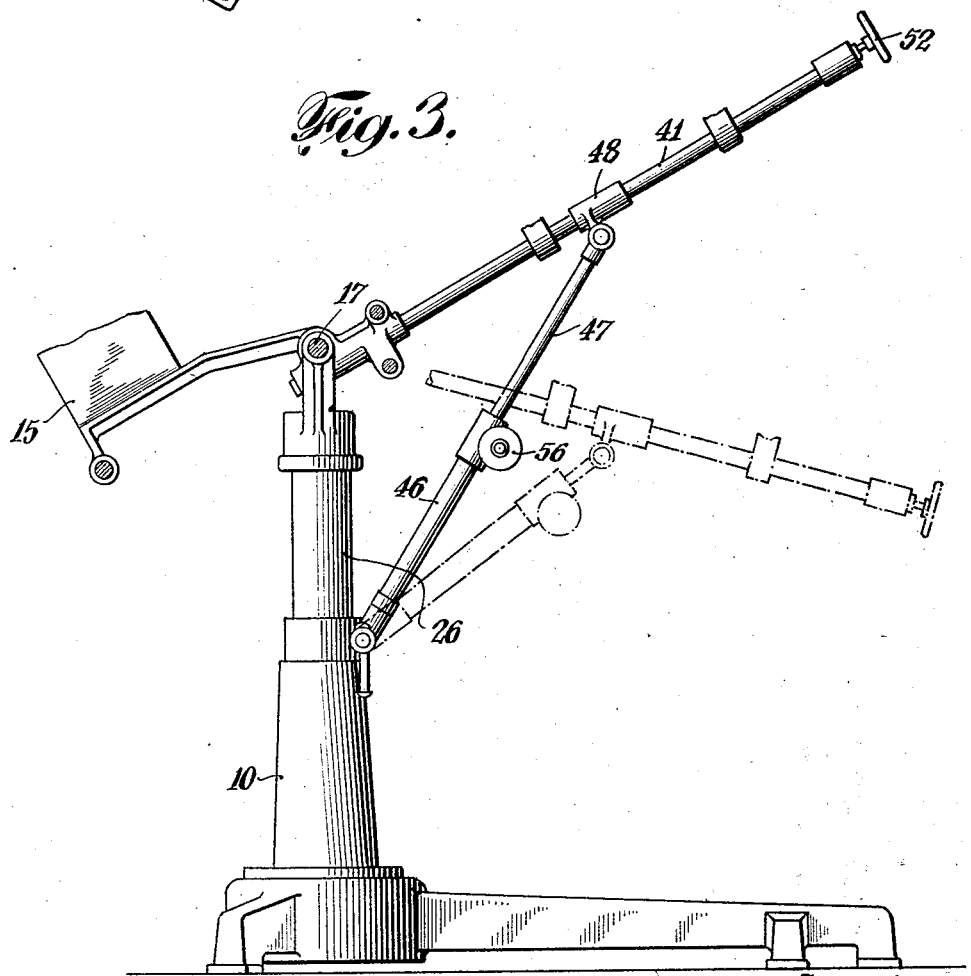
Inventor
Augusto Dina
By his Attorney June 2, 1931.  A. DINA  1,808,497
ADJUSTABLE SUPPORT FOR MOTION PICTURE PROJECTION MACHINES
Filed Aug. 18, 1927   4 Sheets-Sheet 3
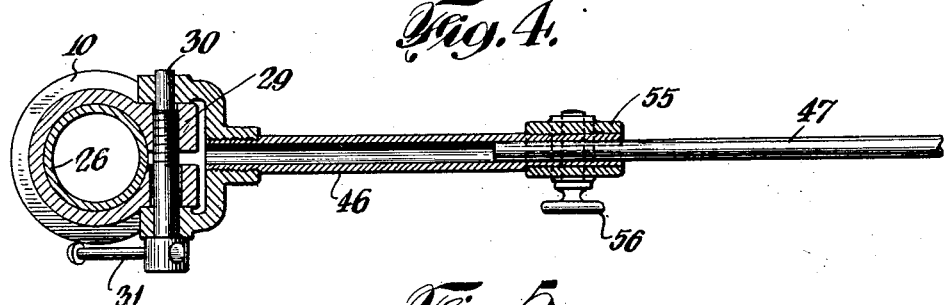
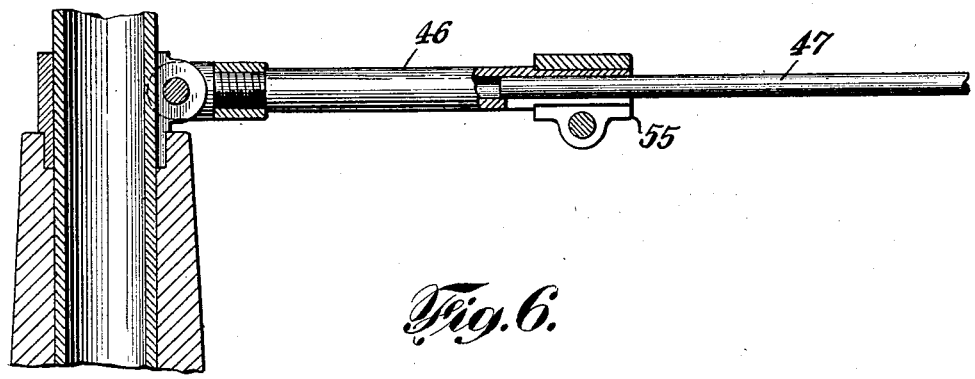
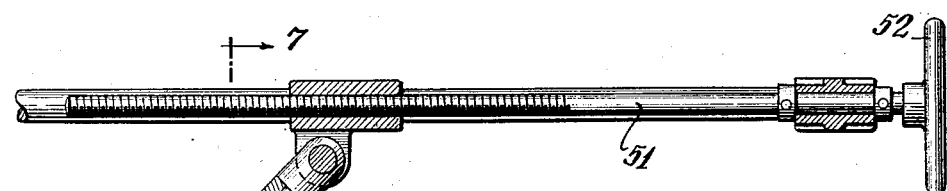
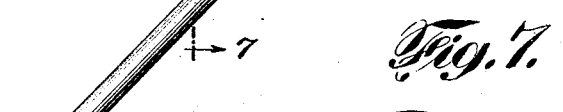
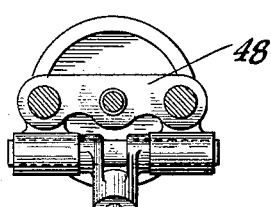
Inventor
Augusto Dina
By his Attorney
Howard W. Dix Patented June 2, 1931

1,808,497

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

ADJUSTABLE SUPPORT FOR MOTION PICTURE PROJECTION MACHINES

Application filed August 18, 1927. Serial No. 213,715.

This invention relates to adjustable supports or standards and more particularly to a new and improved type of pedestal adapted to firmly support motion picture projecting machines and to permit relatively fine angular adjustment thereof, whereby the picture may be accurately positioned upon the screen.

Motion picture projecting devices are commonly mounted at the top and rear of a theatre and must be adjusted so as to project the picture downwardly upon the screen which is placed in front of the audience. The adjustment must be accurately maintained since an extremely slight variation in the line of projection will produce a comparatively large displacement of the picture on the screen. Furthermore, all vibrations must be eliminated in order to prevent disagreeable shaking of the picture.

In large motion picture houses in which the projection machine is mounted in the rear of the gallery, the line of projection varies when the gallery is suddenly filled or emptied due to the fact that the weight of the audience is frequently sufficient to cause a slight sag of the gallery floor. This deviation must be compensated for by a minute adjustment of the projecting apparatus which should preferably be made quickly and readily and without interrupting the operation of the machine. It is essential therefore, in devices of this kind to provide for easy minute adjustment of the angle of projection as well as to permit a coarse adjustment thereof when installing the machine and placing the same in operation. Furthermore, the adjustment when once made must be rigidly maintained.

The standard type of projection machine comprises an upright pedestal having a frame pivotally supported on the upper portion thereof. The various portions of apparatus such as the lamp house, film magazines and projection head are mounted on this frame and are adapted to have a fixed line of projection with respect thereto.

The present invention provides for a movable means for supporting the pivoted frame and for securing both coarse and fine adjustment of the angularity thereof. A supporting strut is consequently provided, extending between the frame and the pedestal and forming in connection therewith a triangle, the length of one or more sides of which may be adjusted as desired. The fine adjustment is obtained by varying one vertex or pivot point of the triangle whereby the angularity of the strut may be changed.

The invention further provides independent means for adjusting the various legs of the triangle formed by the pedestal, frame and supporting strut and for pivotally securing said elements in their adjusted position. Each of the elements may be secured in any desired position irrespective of the adjustment of the other elements and may be separately moved without interfering with the position of said other elements.

The coarse adjustment may be made by telescoping certain parts and after the parts have been clamped in the desired position, a fine adjustment may be obtained by varying the angular position of the strut.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with accompanying drawings forming a part thereof, in which Figure 1 is an elevation of a projecting machine constructed in accordance with this invention.

Figure 8:
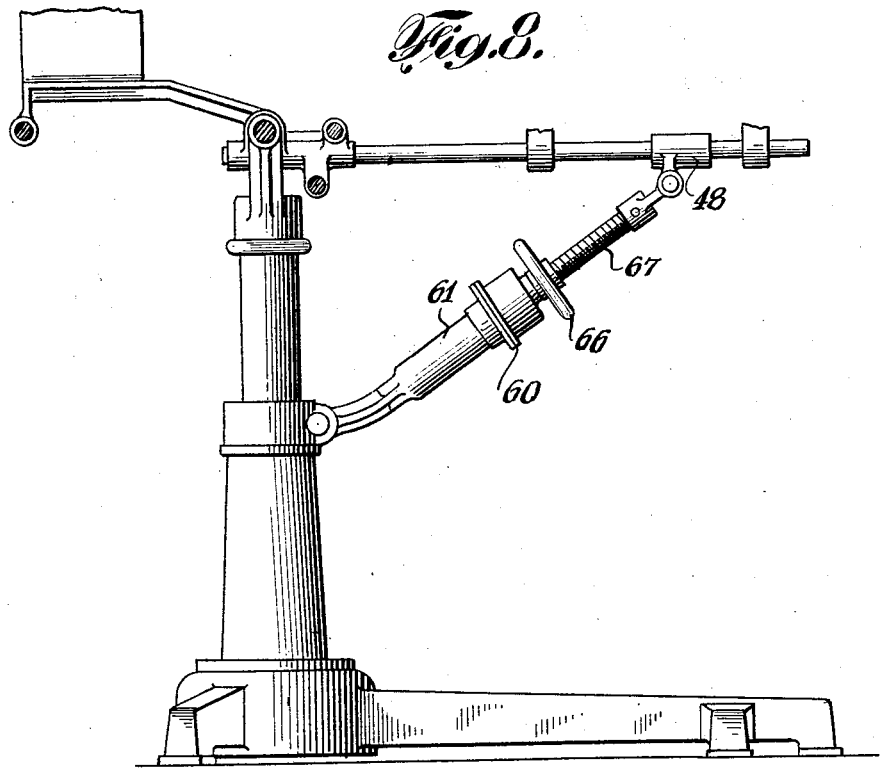
Figure 9:
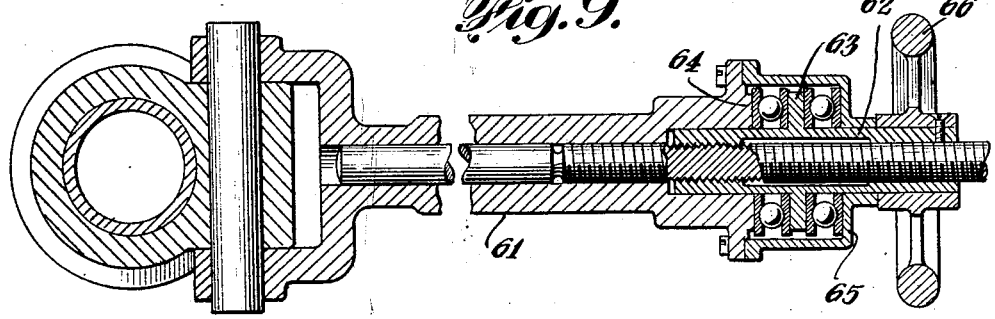

Figure 2 is a plan view of the framework for supporting the various parts thereof, Figure 3 is a side elevation of the adjustable supporting mechanism, Figure 4 is a detail plan view partly in section of the connecting strut, Figure 5 is an elevation thereof, Figure 6 is a section taken on the line 6—6 of Fig. 2 showing the fine adjustment mechanism, Figure 7 is a section taken on the line 7—7 of Fig. 6, Figure 8 is an elevation of the supporting means showing a modified form of adjustable strut, and Figure 9 is a detail sectional view of the strut shown in Fig. 9.

Like reference characters denote like parts in the several figures of the drawings.

In the following description and in the claims, parts will be identified by specific names for convenience, but they are intended to be as generic in their application to similar parts as the art will permit.

Referring to the drawings more in detail, the motion picture projection machine to which this invention has been applied is shown as comprising a pedestal 10 supported on a base 11, which may be of any convenient design. Frame 12 on which lamp house 13, upper film magazine 14, projection head 15 and lower film magazine 16 are supported, is pivotally mounted on the upper portion of pedestal 10 as at pivot point 17.

Although any desired form of supporting base may be employed, pedestal 10 has been shown as mounted upon a base 11 having a central supporting member 20 to which said pedestal is attached and having a plurality of legs 21 extending therefrom, and provided with supporting feet 22. One of the legs 21 may be extended and provided at its end with a plurality of feet 23 for the purpose of more firmly supporting the machine.

Pedestal 10 may be formed of a main section 25 and a tubular section 26 slidable vertically therein. Suitable means such as a worm gear 27 attached to section 25, cooperating with a rack 28 attached to section 26 may be employed for adjusting the height of the pedestal. Split sleeve 29 (Fig. 4) may be secured to section 25 and adapted to frictionally cooperate with section 26 for preventing unauthorized movement thereof. Said sleeve 29 may be clamped about section 26 as by means of threaded bolt 30 and an adjustable handle 31 inserted in the head thereof. Bolt 30 may also serve as supporting means for yoke 31, the purpose of which will be hereinafter described.

Frame 12 comprises member 40 to which the projection head and the film magazines may be attached, said member being pivotally mounted at pivot point 17 to the upper portion of pedestal 10. A pair of rods 41 may be secured in member 40 and supported thereby, extending on the opposite side of pivot point 17 from the projection head and film magazines for the purpose of supporting lamp house 13. Lamp house 13 may be attached to rods 41 by feet 42 which may be clamped thereabout. The particular form of lamp house, projection head, and film magazines employed however, form no part of the present invention and consequently will not be described in detail.

A diagonal supporting strut 45 composed of an outer tubular section 46 and an inner rod-like member 47 slidable therein, is located between pedestal 10 and frame 12, forming in connection therewith a triangle. Section 46 (Figs. 4 and 5) may be threaded into yoke 31 which as previously described, is pivotally connected to pedestal 10. Rod 47 may be pivotally connected as shown in Figs. 6 and 7 to a slidable yoke 48 having a pair of tubular sections 49 in sliding engagement with supporting rods 41 and a central threaded section 50 by means of which the position of said yoke on rods 41 is adjusted.

Threaded rod 51, located between rods 41 and journalled for rotating movement, is extended through threaded section 50. Rod 51 may be turned, as by hand adjustment wheel 52, for governing the position of said yoke 48.

Rod 47 may be clamped in any desired position in tubular section 46 by means of split collar 55 which may be attached to said tubular section 46 and adapted to cooperate with slidable rod 47. Suitable means such as hand screw 56 may be employed for forcing said collar into firm engagement with said rod 47.

In the operation of the apparatus thus far described, in order to angularly vary the line of projection of a picture, the length of any one of the legs of the triangle formed of pedestal 10, strut 45 and frame 12, may be changed as desired. For example, to secure a comparatively coarse adjustment, hand screw 56 may be loosened and rod 47 telescoped in tube 46 until frame 12 is caused to assume approximately the angle desired. Pivot point 17 may then be raised or lowered by loosening bolt 30 and turning worm wheel 27 whereby member 26 may be telescoped in main pedestal member 25. When this adjustment has been obtained, hand wheel 52 may be employed for making minute changes in the angle of projection, rotation of this wheel causing yoke 48 to move longitudinally of supporting rods 41 and thereby varying the angularity of diagonal strut 45.

Obviously, one or more of the above adjustments may be omitted provided the required angle of projection may be obtained by the remaining controls. For example, the coarse adjustment could be made by means of varying the length of strut 45, and the fine adjustment obtained by hand wheel 52. In case it is desired to vary the height of the machine from base 11, pedestal 10 may first be adjusted and then the required direction of the line of projection may be obtained by means of strut 45 and hand wheel 52 as above mentioned.

In a modified form of support disclosed in Figs. 8 and 9, parts similar to those heretofore described have been given similar reference numerals. The supporting base, pedestal and frame are similar to those shown in Fig. 1 and supporting strut 60 may be attached to said pedestal and frame in the manner described in connection with strut 45. Strut 60, however, is composed of an outer tubular member 61 in which a threaded member 62 is journalled for rotary movement.

Member 62 may carry ball race 63 which cooperates with shoulder 64 and housing 65 to prevent longitudinal movement thereof while permitting free rotational movement. Suitable hand wheel 66 may be keyed or otherwise fastened to said threaded member 62 for controlling the motion thereof. Threaded rod 67 may be secured to yoke 48 and extended through threaded member 62 to cooperate therewith. Member 67 is however, freely slidable in tubular member 61 and may be longitudinally adjusted therein by rotary movement of said hand wheel 66.

By means of the construction shown in Figs. 8 and 9, both coarse and fine adjustments may be made by means of the supporting strut. The pitch of the thread on rod 67 may however, be made comparatively great in which case supporting strut 60 could be utilized in obtaining the coarse adjustment, and fine adjustment could be obtained by varying the point of connection thereof with frame 12 as above described.

Obviously the pedestals disclosed in Figs. 3 and 8 may be slidably adjusted by any convenient means as by the worm gear 27 disclosed in Fig. 1. These elements have however, been omitted from Figs. 3 and 8 for the purpose of simplifying the disclosure. Suitable locking means (not shown) may be employed if desired for preventing relative movement between hand wheel 66 and housing 65 except when desired for purposes of adjustment. The necessity for such locking means, however, will depend upon the friction of the various parts and weight of the apparatus supported.

An apparatus constructed as above described may be employed under conditions requiring extremely accurate adjustment and will enable the picture to be registered upon the screen with utmost precision. In case it is desired, however, to vary microscopically the angle of projection during a performance as, for example, to compensate for the effect of varying loads on a balcony upon which the machine is supported, it is only necessary to turn hand wheel 52. This may be done by the operator without in any way interfering with the performance or without disturbing the other adjustments of the machine. Due to the extreme fineness with which this adjustment can be made, the operator may at all times maintain the picture in its desired relation to the screen.

Furthermore, the various clamping means prevent jar or vibration from changing the adjustment of the different elements during use.

The various clamping means permit the length of the strut and of the pedestal to be adjusted prior to placing the machine in operation and then to be positively secured in their adjusted position. Smaller variations in the line of projection are obtained by the micrometer adjustment at the point of attachment of the strut to the frame. The operator may thus make whatever minor adjustments are required during operation without interfering wth the preselected position assumed by the telescoping elements and the rigidity of the various parts prevents vibrations from being transmitted to the machine and from affecting the accuracy of the pictures projected.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

What is claimed is:

1. In a motion picture projecting apparatus having a lamp house, projection head and film magazines, a supporting pedestal therefor and a frame pivotally mounted on said pedestal and supporting said apparatus, means for controlling the angular position of said frame, comprising a diagonal strut, said strut being extensible for obtaining a coarse adjustment of the angularity of said frame, and means for varying the point of support of said strut for securing a fine adjustment thereof.

2. A support for a motion picture apparatus comprising a pedestal, a frame, and a strut arranged in triangular formation, the length of one of the legs of said triangle being variable for securing a coarse adjustment of the angularity of said frame, and the location of one vertex of said triangle being variable for securing a fine adjustment thereof.

3. In a motion picture projecting apparatus having a lamp house, projection head and film magazines, a supporting pedestal therefor and a frame pivotally mounted on said pedestal and supporting said apparatus, means for controlling the angular position of said frame comprising a strut, said strut being formed of telescoping members and being extensible for obtaining a coarse adjustment of the angularity of said frame, clamping means for said telescoping members comprising a split collar secured to one of said members and threaded means for clamping said collar about the other of said members, and means for varying the point of support of said strut for securing a fine adjustment of the angularity of said frame.

4. In a motion picture projecting apparatus having a lamp house, projection head and film magazines, a supporting pedestal therefor and a frame pivotally mounted on said pedestal for supporting said apparatus, means for controlling the angular position of said frame comprising a diagonal strut pivotally secured to said pedestal and slidably secured to said frame, said strut being extensible for obtaining a coarse adjustment of the angularity of said frame and means for varying the point of attachment of said strut to said frame for securing a fine adjustment thereof, comprising a threaded collar secured to said strut, a threaded rod secured in said frame and extending longitudinally thereof, said rod being provided with an adjusting wheel mounted at the rear of said frame.

5. In a motion picture projecting apparatus having a lamp house, projection head and film magazines, a supporting pedestal therefor and a frame pivotally mounted on said pedestal and supporting said apparatus, means for controlling the angular position of said frame comprising a diagonal strut pivotally secured to said pedestal and slidable on said frame, said strut being formed of telescoping members, a split collar carried on one of said members and means for clamping said collar against the other of said members for locking said strut in position, and means for varying the point of attachment of said strut to said frame comprising a threaded collar secured to said strut, a threaded rod secured to said frame for operating said collar and an adjusting wheel associated with said rod and located at the rear of said frame, a coarse adjustment of the angularity of said frame being obtained by telescoping said strut and a fine adjustment thereof being obtained for varying the point of attachment of said strut.

AUGUSTO DINA.